US008358625B2

(12) United States Patent
Koskinen

(10) Patent No.: US 8,358,625 B2
(45) Date of Patent: Jan. 22, 2013

(54) METHOD AND APPARATUS FOR SIGNALING NEIGHBOR CELL TRANSMISSION FRAME ALLOCATIONS

(75) Inventor: Henri Markus Koskinen, Espoo (FI)

(73) Assignee: Nokia Corporation, Espoo (FI)

( * ) Notice: Subject to any disclaimer, the term of this patent is extended or adjusted under 35 U.S.C. 154(b) by 693 days.

(21) Appl. No.: 12/364,484

(22) Filed: Feb. 2, 2009

(65) Prior Publication Data

US 2010/0195582 A1    Aug. 5, 2010

(51) Int. Cl.
    *H04W 4/00* (2009.01)
(52) U.S. Cl. .......... 370/331; 455/437; 455/443
(58) Field of Classification Search .......... None
    See application file for complete search history.

(56) References Cited

U.S. PATENT DOCUMENTS

| 2008/0310359 | A1* | 12/2008 | McBeath et al. | 370/329 |
|---|---|---|---|---|
| 2009/0196266 | A1* | 8/2009 | Wu et al. | 370/338 |
| 2009/0238098 | A1* | 9/2009 | Cai et al. | 370/254 |
| 2010/0177746 | A1* | 7/2010 | Gorokhov et al. | 370/336 |

FOREIGN PATENT DOCUMENTS

| WO | 2008127185 A1 | 10/2008 |
|---|---|---|
| WO | 2008135851 A1 | 11/2008 |
| WO | 2009129261 A1 | 10/2009 |

OTHER PUBLICATIONS

International Search Report and Written Opinion of the International Searching Authority for corresponding Patent Cooperation Treaty Application No. PCT/IB2010/000198, dated May 11, 2010, pp. 1-12.
3GGP Draft; R1-070532, 20070112, "Cell-Specific Integer Sequences for Frequency Positioning of DL RS on Subframe Basis", AN XP050104558, Huawei.
3rd Generation Partnership Project; Technical Specification Group Radio Access Network; Evolved Universal Terrestrial Radio Access (E-UTRA) Radio Resource Control (RRC); Protocol specification (Release 8), TS 36.331 V8.5.0, Mar. 2009, 204 pages.

* cited by examiner

*Primary Examiner* — Jianye Wu
(74) *Attorney, Agent, or Firm* — Squire Sanders (US) LLP

(57) ABSTRACT

In accordance with an example embodiment of the present invention, a method is disclosed that comprises receiving at a base station an indication of a first resource allocation in each of one or more neighbor base stations, and transmitting to at least one associated user equipment a message comprising a second indication of whether the first resource allocations of the one or more neighbor base stations are a subset of a second resource allocation of the base station.

26 Claims, 5 Drawing Sheets

METHOD AND APPARATUS FOR SIGNALING NEIGHBOR CELL TRANSMISSION FRAME ALLOCATIONS

TECHNICAL FIELD

The present application relates generally to method and apparatus for neighbor cell transmission frame allocation signaling in an environment such as a $4^{th}$ generation (4G) network.

BACKGROUND

As part of normal operation, a user equipment (UE) may need to collect a variety of measurements of the neighbor cells and their base stations within its reception range on a regular basis to help support operations such as handoff and tuning of signals, among others. According to certain protocols, such measurements are to be performed on specially designated reference signals. Thus it is advantageous for the UE to have more accurate information on the neighbor cell resource allocations and from the therein implied reference symbol locations to obtain improved acquisition of measurements.

SUMMARY

Various aspects of examples of the invention are set out in the claims. According to a first aspect of the present invention, a method comprises receiving at a base station an indication of a first resource allocation in each of one or more neighbor base stations, and transmitting to at least one associated user equipment a message comprising a second indication of whether the first resource allocations of the one or more neighbor base stations are a subset of a second resource allocation of the base station.

According to a second aspect of the present invention, An apparatus comprises a first module configured to receive at a base station an indication of a first resource allocation in each of one or more neighbor base stations, and a second module configured to transmit to at least one user equipment a message comprising a second indication of whether the first resource allocations of the one or more neighbor base stations are a subset of a second resource allocation of the base station According to a third aspect of the present invention, A system comprises a first apparatus configured to receive at a base station an indication of a first resource allocation in each of one or more neighbor base stations; and transmit to at least one associated user equipment a message comprising a second indication of whether the first resource allocations of the one or more neighbor base stations are a subset of a second resource allocation of the base station; and a second apparatus configured to receive the message from the first apparatus; and perform one or more measurements based on the second indication.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the disclosure may be implemented in any type of suitably arranged device or system.

Figure 1:
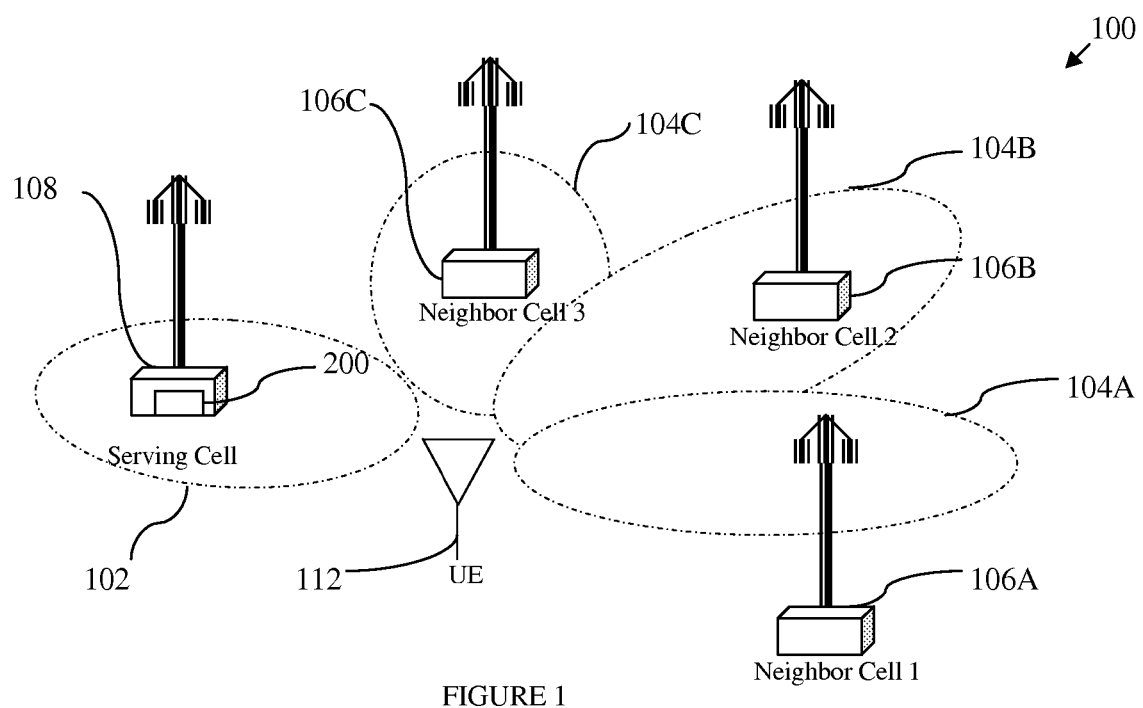
FIG. 1 illustrates an example wireless system.

FIG. 1 illustrates an example wireless system 100 that may include a serving cell 102, a first neighbor cell 104A, a second neighbor cell 2 104B, a third neighbor cell 104C, and a user equipment (UE) 112. The neighbor cell 104A has a base station (BS) and associated transmission tower 106A. Similarly, the neighbor cell 104B and 104C may have the associated base stations 106B and 106C respectively. The UE 112 may be served by the serving cell 102, which has a serving base station 108. An UE such as the UE 112 may need to be covered by at least one cell. For the purpose of the present disclosure, the neighbor cells 104A-C and the associated base stations may be viewed as performing similar functions and thus may be referred to interchangeably when there is not any contextual ambiguity.

The serving cell 102 may broadcast limited information about a transmission frame allocation from its neighbor cells such as 104A-C as compared to the transmission frame from the serving cell 102 itself. A transmission frame may contain one or more reference signals for purposes such as measurements. In one embodiment, the serving cell 102 may receive signaling on the multimedia broadcast single frequency network (MBSFN) subframe allocations from 104B and 104C. The UE 112 may obtain indications on channel estimates based on the measure of reference signals in a transmission frame from a neighbor cell such as 104A. Because some transmission frames are non-MBSFN subframes, each of the neighbor cells 104A-C may broadcast limited information about the MBSFN subframe allocation as compared to that in those neighbor cells 104A-C, at least to allow for time-efficient measuring. The MBSFN subframe may be a regular MBSFN subframe or a blank subframe which is a variant of the regular MBSFN subframe and does not contain any control symbols.

The UE 112 may receive broadcast configurations on measurements in order to support mobility service between cells in a wireless network such as 3G network and a long-term evolution (LTE) network. The UE 112 may collect the channel measures as configured by the wireless network so that the strength and distances of channels to the serving cell 102 and the neighbor cells 104A-C are collected and certain thresholds for the measurements are monitored. In one embodiment, the UE 112 is in an active state indicated by a radio resource control (RRC) connected state and has an active connection to the serving cell 102. Then the UE 112 may report the monitoring results to the network via the serving cell 102, allowing the network to make a handover decision. When the UE 112 is in an idle state, the channel measure may help define when the UE 112 may need to change the cell that the UE 112 is currently monitoring. The UE 112 may be one of a 3G mobile station, a 4G mobile station and a mobile computing device. The serving base station 108 in the serving cell 102 may have a resource control module 200 configured to communicate with the neighbor cells 104A-C and the associated UE 112 for the purpose of radio resource management. More details of the resource control module 200 are illustrated in and described in relation to FIG. 2 respectively.

In one embodiment, the wireless network system 100 may be a UMTS terrestrial radio access network (UTRAN) for LTE, or E-UTRAN, that may support multimedia broadcast multicast service (MBMS) and multimedia broadcast single-frequency network (MBSFN) operations. The wireless network system 100 may achieve macro diversity gain by transmitting the same signals from the base stations 106A-C and 108. The MBMS may be provided either on a dedicated MBMS frequency layer or a mixed layer, where unicast transmission (including single-cell MBMS content) may be time-multiplexed with MBSFN transmission on the same frequency layer. In the latter case, the MBSFN transmission may occupy dedicated subframes with a fixed interval such as 1-millisecond which LTE transmissions are divided into. The structure of the dedicated subframe may differ from a general unicast subframes in terms of cyclic prefix and reference signals. As a result of this difference, first OFDM symbols of an MBSFN subframe may contain reference signals, while reference signals are also transmitted in some of the middle symbols of the general unicast subframes. Depending on the configured radio resource allocation to MBSFN subframe transmissions, neighbor cells 104A-C may have different MBSFN subframe allocations.

The UE 112 may need to measure a cell such as 104A in those subframes with a higher density of reference signals, the subframes such as the basic unicast subframes, in order to obtain a more accurate channel estimate.

Figure 2:
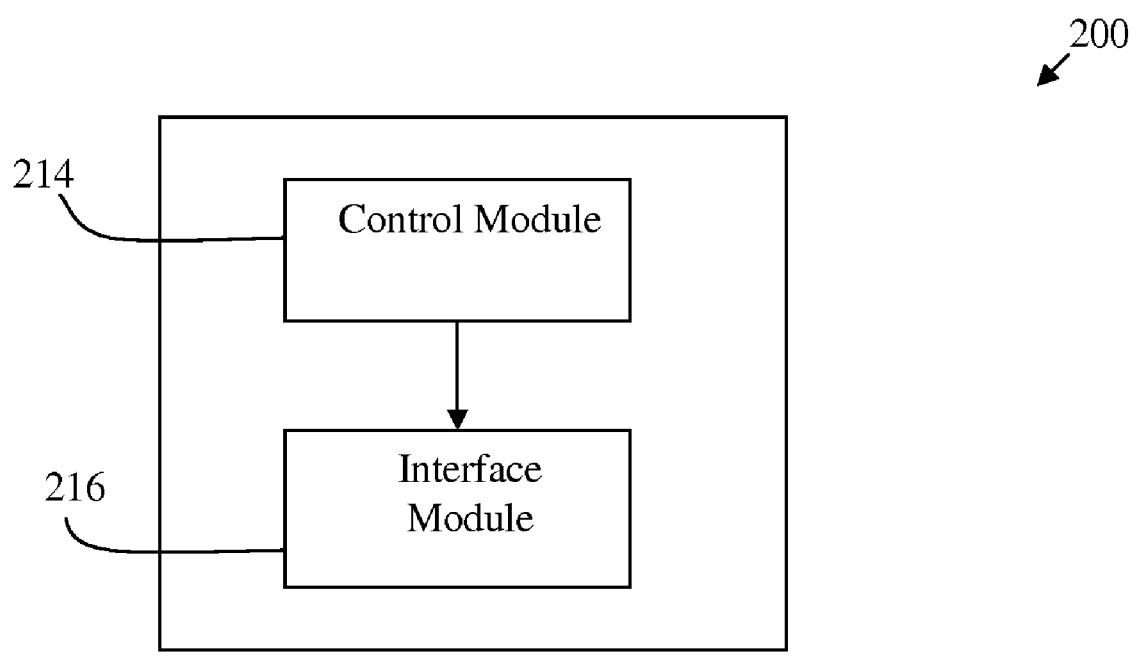
FIG. 2 illustrates part of an example resource control module in a base station.

FIG. 2 illustrates part of an example resource control module 200 in the base station 108 of FIG. 1. The resource control module may include a control module 214 and an interface module 216. The interface module 216 may be configured to communicate with the UE 112 and the neighbor cells 104A-C for resource control signaling.

The control module 214 may be configured to collect the indications on the neighbor cell resource allocation in the neighbor cell 104A-C and generate a neighbor cell resource allocation map based on one or more resource allocation indications. The resource allocation map may be a conceptual representation of an overall view of neighbor cell resource allocations. More details of the resource allocation map are illustrated in and described in relation to FIG. 4 respectively. The control module 214 may also be configured to generate a search subset of the neighbor resource allocations based on the neighbor cell resource allocation map. The search subset is a subset of all transmission frame allocations from the neighbor cells 140A-C and may more accurately define the resource allocation that the UE 112 may use to collect the UE measurements. The control module 214 may also be configured to build a neighbor cell configuration message that include the search subset of neighbor resource allocations to be sent to the UE 112 via the interface module 216.

Figure 3:
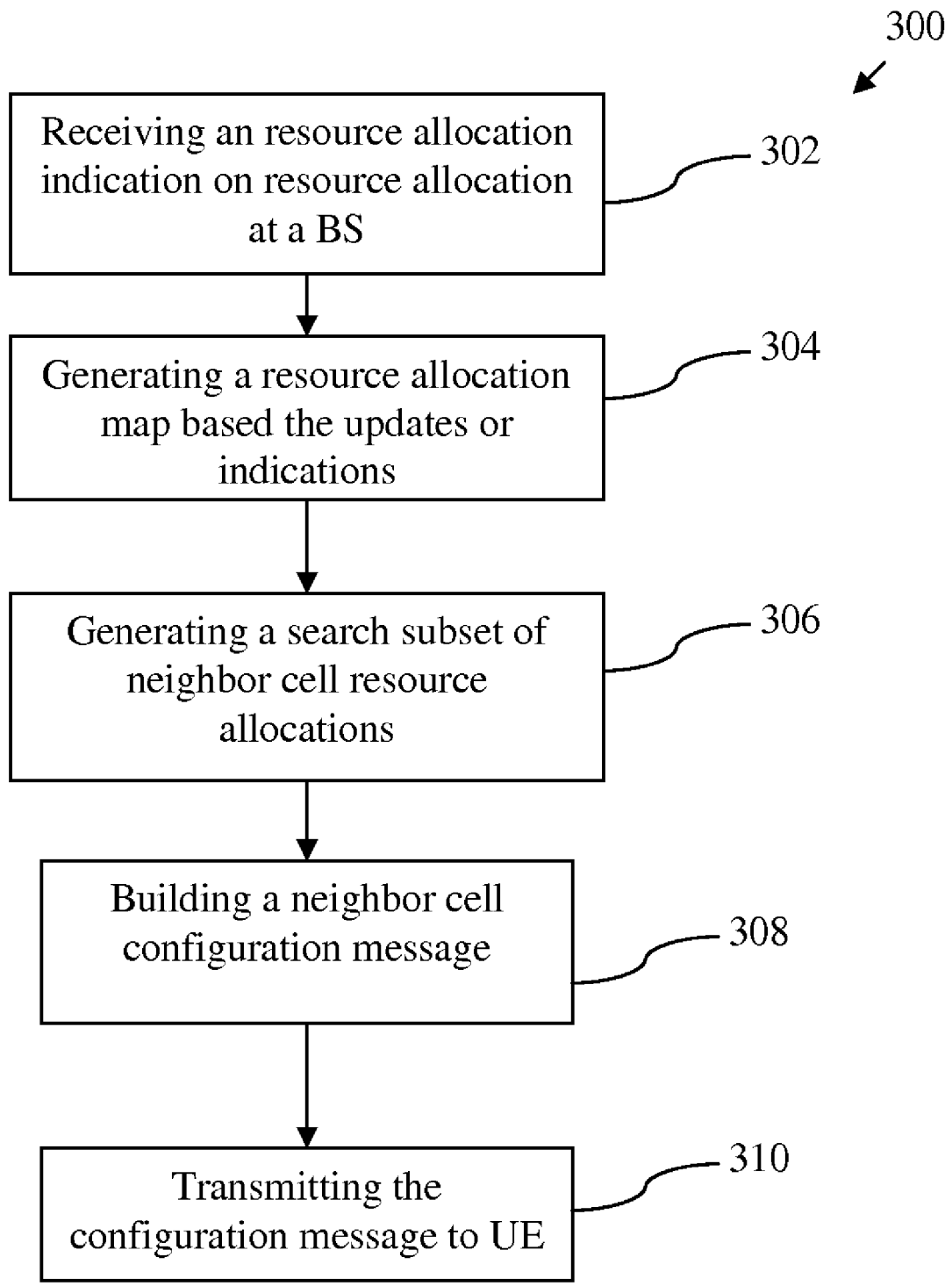
FIG. 3 illustrates an example method for transmitting neighbor cell configuration message to at least one associated UE.

FIG. 3 illustrates an example method 300 for transmitting the search subset of neighbor cell resource allocations to the UE 112. The method 300 may include receiving an indication at the serving base station 108 on neighbor resource allocation in each of one or more neighbor cells at block 302, generating a resource allocation map at block 304, generating a search subset of neighbor cell resource allocations at block 306, building a neighbor cell configuration notification message at 308, and transmitting the neighbor cell configuration message to at least one UE such as the UE 112.

Receiving the resource allocation indications on neighbor cell resource allocations at block 301 may include receiving a broadcast message from each of the neighbor cells 104A-C on the MBSFN subframe allocation and other types of channel allocations at the serving cell 102. Receiving the resource allocation indications on neighbor cell resource allocations at block 301 may also include receiving the indication on the MBSFN subframe allocations in the neighbor cells 104A-C from other sources such as a network center. The resource allocation indications may be received through a signaling protocol such as X1 as defined in the LTE standards specifications or other suitable signaling protocols.

Generating the neighbor cell resource allocation map at block 304 may include generating a neighbor resource allocation map based on the received resource allocation indications. Generating the neighbor cell resource allocation map at block 304 may also include aggregating the indications from the neighbor cells 104A-C into an overall logical view of neighbor cell resource allocation. The resource allocation may be an allocation of a transmission frame in reference to a transmission frame allocation at the serving cell 102.

Generating the search subset of neighbor resource allocations at block 306 may include summarizing the information in the neighbor cell resource allocation map and converting the summarized information into a representation of the search subset. One example of the presentation of the search subset is a bitmap representation. The search subset may represent a more accurate search space for the UE 112 to perform channel search and collect various measurements. In one embodiment, the allocation of MBSFN subframes are the channel resource allocation to be monitored and searched by the UE 112.

Building a neighbor cell configuration message at block 308 may involve creating a protocol information element such has neighborCellConfiguration as specified in the RRC protocol and including in the protocol information element the bitmap indicators of the search subset for the neighbor cell resource allocations. Transmitting the neighbor cell configuration message at block 310 may include transmitting a protocol message that may include the protocol information element neighborCellConfiguration to the UE 112 and other associated UEs if they are present.

The allocations of resources at different base stations such as 106A-C may not need to be of similar size. For example, the neighbor cell 104B may provision an allocation of resources for a single broadcast data service stream, while the serving base station 108 may provision an allocation of resources for multiple broadcast data service stream. As a result, the allocation of resources of the serving cell 102 has a larger size. In this exemplary scenario, an indicator on whether the allocations of all neighbor cells 104A-C are the same or different relative to the allocation of the serving cell 102 may result in the allocations being indicated as different. In such a scenario, the UE 112 may not be able to exclude any potential allocation area as the allocation area of the neighbor cell 104B except for the areas that are specifically designated as ones that may not have been occupied by any allocation of resources.

In one embodiment of the present disclosure, an indicator indicates whether the allocation of all neighbor cells 104A-C is a subset relative to the allocation of the serving cell 102, including the case where the allocation of neighbor cells 104A-C is the same as that of the serving cell 102, may be sent to the UE 112. Alternately the indicator may also indicate that the allocation of all neighbor cells 104A-C is not a subset relative to the allocation of the serving cell 102. With such an indicator, one scenario may be that the UE 112 may advantageously receive the signaling that the allocation of neighbor cell 104B is a subset of the allocation of the serving cell 102 when the allocation of neighbor cell 104B fully overlaps with that of the serving cell 102. In such a scenario, the UE 112 may be advantageously informed that the potential allocation area of neighbor cell 104B is limited to at most the allocation area of serving cell 102. The UE 112 may in such a scenario execute measurements in any allocation area that does not overlap with the known allocation area of its serving cell 102. More details on this may be found in FIG. 4 and the related description.

Figure 4:
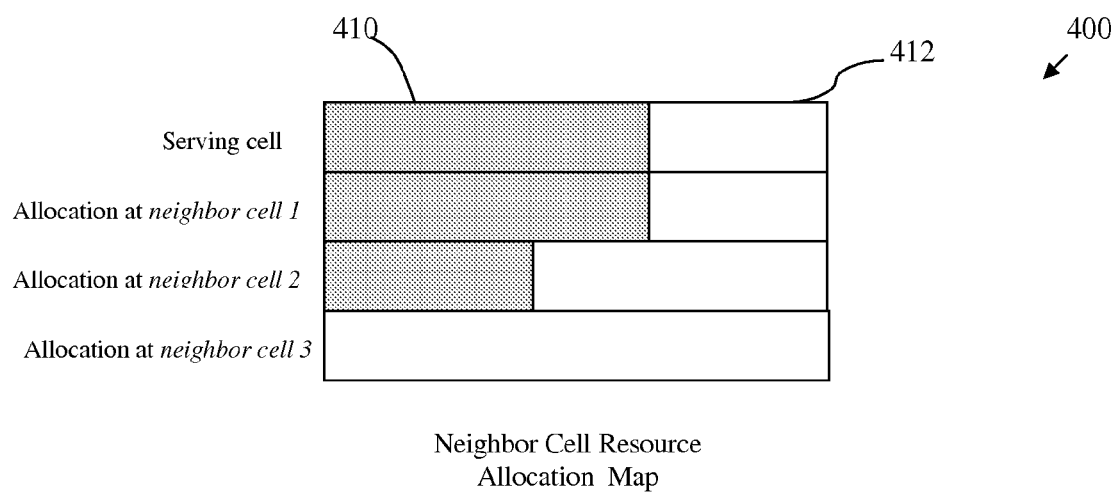
FIG. 4 illustrates an example neighbor cell resource allocation map.

FIG. 4 illustrates the example neighbor cell resource allocation map 400. The neighbor cell resource allocation map 400 may include a logic representation of entire search space of the neighbor cell resource allocations and a search subset that may include only the area of neighbor cell resource allocations that are of interest from the perspective of the UE 112 for the purpose of channel measurements. The neighbor cell resource allocation map 400 may include two areas, the shaded area 410 and white-space area 412. The area 410 may represent the neighbor cell resource allocations that overlaps with that of the serving cell 102 and this area may be excluded from the search by the UE 112 for the purpose of channel measurements. As shown in FIG. 4, the allocation of the transmission frame of the serving BS 108 that is of interest to the UE 112, such as the MBSFN subframes, may entirely overlap with that of the neighbor cell 1 104A.

FIG. 4 may illustrate a logic representation of the resource allocation area only along one axis. It is known to ones skilled in the art that this axis may comprise time, frequency or code domain multiplexing. It will further be understood that the allocation area may also comprise multiple axes. For example, orthogonal frequency-division multiple access (OFDMA) may have time and frequency axes, and the OFDMA with orthogonal coding may have time, frequency and code axes.

Figure 5:
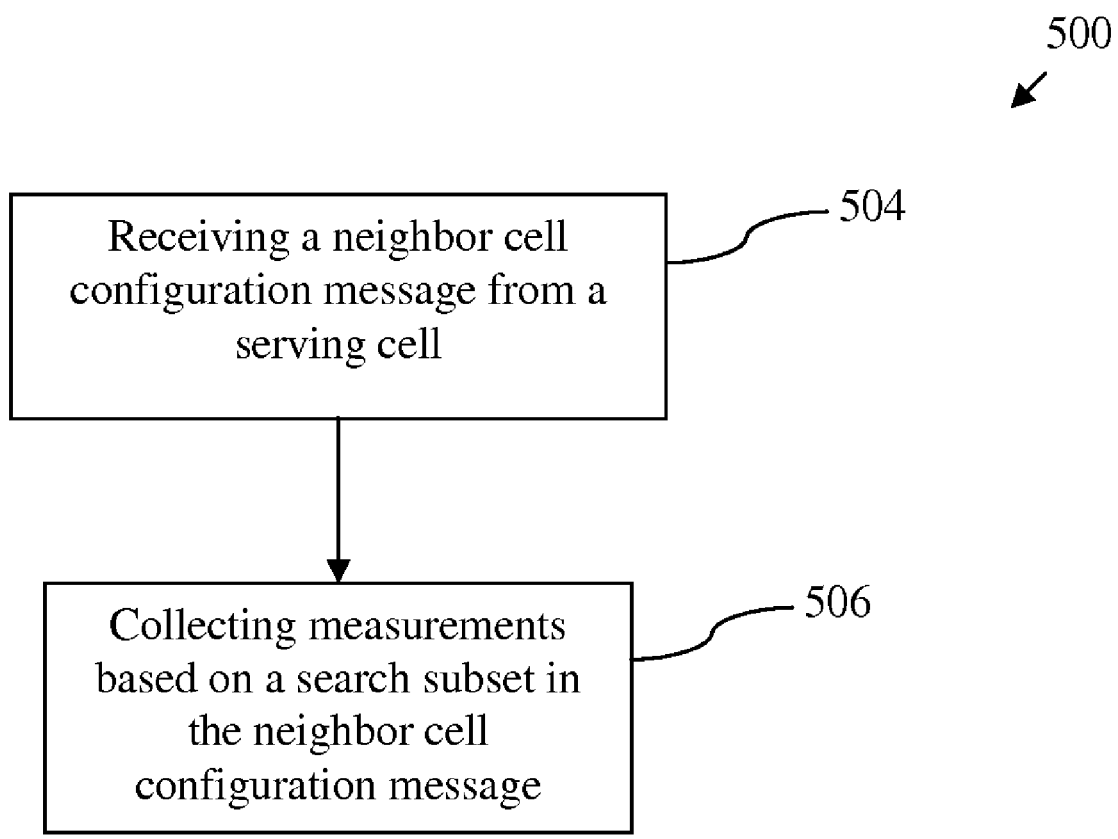
FIG. 5 illustrates an example method for collecting measurements based on a search subset of neighbor cell resource allocation.

FIG. 5 illustrates an example method 500 for collecting measurements based on the search subset of the neighbor cell resource allocations at the UE 112. The method 500 may include receiving a neighbor cell resource configuration message from the serving cell 112 at block 504 and collecting measurements based on a search subset contained in the neighbor cell resource configuration message at block 506. Receiving the neighbor cell resource allocation message at 504 may include extracting the search subset for the neighbor cell resource configuration message. Collecting measurements at block 506 may include performing one or more channel measurements based on the search subset of neighbor resource allocation.

Without in any way limiting the scope, interpretation, or application of the claims appearing below, a technical effect of one or more of the example embodiments disclosed herein may be an LTE node B and a 3G or 4G mobile stations.

Embodiments of the present invention may be implemented in software, hardware, application logic or a combination of software, hardware and application logic. The software, application logic and/or hardware may reside on a memory, a processor, a computing device or a wireless network node. If desired, part of the software, application logic and/or hardware may reside on a computing device or a network device, part of the software, application logic and/or hardware may reside on another network device, and part of the software, application logic and/or hardware may reside on a computing device or network device. The application logic, software or an instruction set is preferably maintained on any one of various conventional computer-readable media. In the context of this document, a "computer-readable medium" may be any media or means that can contain, store, communicate, propagate or transport the instructions for use by or in connection with an instruction execution system, apparatus, or device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
receiving at a base station at least one indication of one or more first resource allocations in one or more neighbor base stations; and
transmitting from the base station to at least one associated user equipment a message comprising a second indication of whether the first resource allocations in each of the one or more neighbor base stations are a subset of a second resource allocation of the base station.

2. The method of claim 1, wherein transmitting the message further comprises transmitting a neighbor cell configuration message comprising the second indication of whether the first resource allocations of the one or more neighbor base stations are a subset of the second resource allocation of the base station.

3. The method of claim 2, further comprising receiving the neighbor cell configuration message at the at least one associated user equipment.

4. The method of claim 3, further comprising performing one or more user equipment measurements based on the second indication.

5. The method of claim 1, wherein the second resource allocation is a multimedia broadcast single frequency network (MBSFN) subframe allocation.

6. The method of claim 1 wherein transmitting the message further comprises generating one of a first indicator indicating that not all of the first resource allocations are a subset of the second resource allocation and a second indicator indicating that each of the first resource allocations is a subset of the second resource allocation.

7. The method of claim 1, further comprising generating a neighbor cell resource allocation map comprising the first resource allocations and the second resource allocation to facilitate generating the second indication.

8. The method of claim 7, wherein the second indication indicates a search subset of the neighbor cell resource allocation map.

9. The method according to claim 1, wherein, in the receiving, the second indication comprises two bits where bit value 10 indicates that multimedia broadcast single frequency network subframe allocations of each of the one or more neighbor base stations are identical to or subsets of that in the base station.

10. The method according to claim 1, wherein said second resource allocation is defined in at least one of time, frequency, and code domain.

11. An apparatus, comprising:
a first module configured to receive at a base station at least one indication of one or more first resource allocations in one or more neighbor base stations; and
a second module configured to transmit from the base station to at least one user equipment a message comprising a second indication of whether the first resource allocations in each of the one or more neighbor base stations are a subset of a second resource allocation of the base station.

12. The apparatus of claim 11, wherein the user equipment is one of a third generation (3G) mobile station, a 4G mobile station and a mobile computing device.

13. The apparatus of claim 11, wherein the apparatus is one of a long term evolution (LTE) node B (eNodeB), a LTE-advance node B, and a 3rd generation partnership project (3GPP) standards compliant access node.

14. The apparatus of claim 11, wherein the second module is further configured to generate one of a first indicator indicating that not all of the first resource allocations are a subset of the second resource allocation and a second indicator indicating that each of the first resource allocations is a subset of the second resource allocation.

15. The apparatus of claim 11, wherein the second resource allocation is a multimedia broadcast single frequency network (MBSFN) subframe allocation.

16. The apparatus of claim 15, wherein the MBSFN subframe allocation is one of a regular MBSFN subframe allocation and a blank subframe allocation.

17. A system, comprising
a first apparatus configured to receive at least one indication of one or more first resource allocations in one or more neighbor base stations, and
transmit to at least one associated user equipment a message comprising a second indication of whether the first resource allocations in each of the one or more neighbor base stations are a subset of a second resource allocation of the first apparatus; and
a second apparatus configured to receive the message from the first apparatus, and
perform one or more measurements based on the second indication.

18. The system of claim 17, wherein the first apparatus is one of a 3GPP base station, a LTE node B, and an eNodeB and the second apparatus is one of a 3G mobile station, a 4G mobile station and a mobile computing device.

19. The system of claim 17, wherein the second apparatus is configured to receive the message via a radio resource control protocol.

20. The system of claim 17, wherein the one or more measurements comprise at least a channel measurement of the second apparatus.

21. A computer program product comprising a non-transitory computer-readable medium bearing computer program code embodied therein for use with a computer, the computer program code comprising:
code for receiving at a base station at least one indication of one or more first resource allocations in one or more neighbor base stations; and
code for transmitting from the base station to at least one associated user equipment a message comprising a second indication of whether the first resource allocations of each of the one or more neighbor base stations are a subset of a second resource allocation of the base station.

22. The system according to claim 17, wherein the second indication comprises two bits where bit value 10 indicates that multimedia broadcast single frequency network subframe allocations of each of the one or more neighbor base stations are identical to or subsets of that in the base station.

23. A computer program product according to claim 21, wherein the second indication comprises two bits where bit value 10 indicates that multimedia broadcast single frequency network subframe allocations of each of the one or more neighbor base stations are identical to or subsets of that in the base station.

24. An apparatus, comprising:
at least one processor; and
at least one memory storing computer program code;
the at least one memory and the computer program code configured, with the at least one processor, to cause the apparatus at least to:
receive from an associated base station an indication of a first resource allocation of the associated base station; and
receive from the associated base station at least one second indication of whether one or more second resource allocations in one or more neighbor base stations of the associated base station are the same or a subset of the first resource allocation of the associated base station.

25. The apparatus according to claim 24, wherein the second indication comprises two bits where bit value 10 indicates that multimedia broadcast single frequency network subframe allocations of each of the one or more neighbor base stations are identical to or subsets of that in the base station.

26. The apparatus according to claim 24, the at least one memory and the computer program code further configured, with the at least one processor, to cause the apparatus at least to:
exclude the first resource allocation from a measurement configuration in dependence of the second indication.

* * * * *